United States Patent
Sonoda et al.

(12)

(10) Patent No.: US 6,236,918 B1
(45) Date of Patent: *May 22, 2001

(54) VEHICLE ELECTRONIC CONTROL APPARATUS

(75) Inventors: Toshiyuki Sonoda; Kenji Okamoto; Hiroaki Yamazaki; Tomokazu Ito, all of Nagoya (JP)

(73) Assignees: Sumitomo Wiring Systems, Ltd.; Harness System Technologies Research, Ltd.; Sumitomo Electric Industries, Ltd., all of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/843,583

(22) Filed: Apr. 16, 1997

(30) Foreign Application Priority Data

Apr. 23, 1996 (JP) ........................................ 8-101488

(51) Int. Cl.[7] .......................... B60R 16/02; B60L 1/00
(52) U.S. Cl. ................................ 701/36; 307/10.1
(58) Field of Search .......................... 701/1, 36; 307/9.1, 307/10.1

(56) References Cited

U.S. PATENT DOCUMENTS

| 4,731,769 | * | 3/1988 | Schaefer et al. | 369/6 |
|---|---|---|---|---|
| 4,739,183 | * | 4/1988 | Tokura et al. | 307/9 |
| 5,251,211 | * | 10/1993 | Mutoh et al. | 370/85.1 |
| 5,289,378 | * | 2/1994 | Miller et al. | 364/424.04 |
| 5,450,403 | * | 9/1995 | Ichii et al. | 370/85.1 |
| 5,490,064 | * | 2/1996 | Minowa et al. | 701/1 |
| 5,555,502 | * | 9/1996 | Opel | 364/424.05 |
| 5,701,418 | * | 12/1997 | Luitje | 395/200.16 |
| 5,783,955 | * | 7/1998 | Shibata et al. | 327/108 |
| 5,794,164 | * | 8/1998 | Beckert et al. | 701/1 |
| 5,861,968 | * | 1/1999 | Kerklaan et al. | 359/152 |
| 5,889,337 | * | 3/1999 | Ito et al. | 307/10.1 |
| 6,020,811 | * | 2/2000 | Saito et al. | 340/438 |

* cited by examiner

Primary Examiner—Michael J. Zanelli
(74) Attorney, Agent, or Firm—Bierman, Muserlian and Lucas

(57) ABSTRACT

A vehicle electronic control apparatus (1) includes an electronic control section (2) received in an accommodating cavity (23) in an instrument panel (22) in an automotive vehicle for controlling electronic equipments in the vehicle and a switch section (3) detachably attached to the electronic control section (2) for applying command signals to the electronic control section (2). The switch section (3) is provided with a communication function part (27) which serves as a local area network (LAN) manager so that the electronic control section (2) can control the electronic equipments. This construction enables an expensive electronic control section (2) to be used in common in different types of automotive vehicle regardless of presence or absence of the vehicle LAN. The switch section (3) having the communication function part (27) can utilize the vehicle LAN.

4 Claims, 4 Drawing Sheets

VEHICLE ELECTRONIC CONTROL APPARATUS

BACKGROUND OF THE INVENTION

This invention relates to an electronic control apparatus for a vehicle which is attached to an instrument panel in a vehicle and controls a vehicle's electronic equipment through a local area network (LAN) installed in the vehicle.

Heretofore, a LAN in vehicle has included electronic equipments such as an air compressor, a suspension control, a compact disc (CD) changer and the like and communication cables such as wire harnesses and the like which interconnect such electronic equipments. An apparatus which controls the electronic equipments through the vehicle LAN may be formed together with a car audio unit or the like, which is fitted into an accommodating cavity in the center of an instrument panel in the vehicle.

Such an electronic control apparatus installed in a vehicle includes an electronic control section which controls the respective electronic equipments and a switch section having manual switches connected to the respective electronic equipments whereby a driver operates the equipments by the switches. The electronic control section has a communication function part of the vehicle LAN. The communication function part serves as a LAN manager which controls the electronic equipments through the vehicle LAN by way of time-division multiplex communication. The switch section is detachably coupled to the electronic control section by a simple interface, through which command signals from the manual switches are transferred to the electronic control section.

The driver can control the respective electronic equipments through the communication function part of the electronic control section by operating the manual switches of the vehicle electronic control apparatus, thereby enabling playback of a CD or turning on an air conditioner.

In general, a vehicle is provided with equipments or devices commensurate with its price. Thus, expensive vehicles are provided with various electronic equipments such as a car navigation system, audio system having a CD changer and the like, which cheaper vehicles are provided with only a cassette deck. Thus, electronic control apparatuses LAN include various types of equipment. Only in more expensive cars having various extra electronic equipments fitted therein is an electronic control apparatus required with communication function part serving as a LAN manager. Consequently, it is necessary to prepare a vehicle electronic control apparatus or its electronic control section specific to the type of car. This results in an increase in the number of types of vehicle electronic equipment or electronic control section, an increase in the kinds of parts to be managed in the process and increased costs.

SUMMARY OF THE INVENTION

An object of the present invention is to provide a vehicle electronic control apparatus which can effectively utilize a local area network (LAN) in vehicle and can be commonly applied to different types of vehicle.

A vehicle electronic control apparatus in accordance with the present invention comprises: an electronic control section received in an accommodating cavity in an instrument panel in a vehicle provided with a local area network (LAN) for controlling electronic equipments in the vehicle; and a switch section connected to the electronic control section and having manual switches by which a driver provides command signals to the electronic control section. The switch section is provided with a communication function part which serves as a LAN manager so that the electronic control section can control the electronic equipments.

Preferably, the communication function part has a multiplex communication function.

In the vehicle electronic control apparatus, since the communication function part is provided in the switch section which is separate from the electronic control section, it is possible to prepare different types of switch section depending on whether a LAN system is present. It is thus possible to use a common electronic control section regardless of whether a LAN system exists. The switch section may be designed in compliance with an interior of vehicle.

In the event of providing the multiplex communication function in the communication function part, it is possible to decrease the number of communication cables such as wire harnesses since communication between the vehicle electronic control apparatus and the respective electronic equipments can be effected by multiplex communication.

DETAILED DESCRIPTION OF THE PREFERRED EMBODIMENTS

Referring now to FIGS. 1 to 4, an embodiment of a vehicle electronic control apparatus in accordance with the present invention will be described below.

Figure 1:
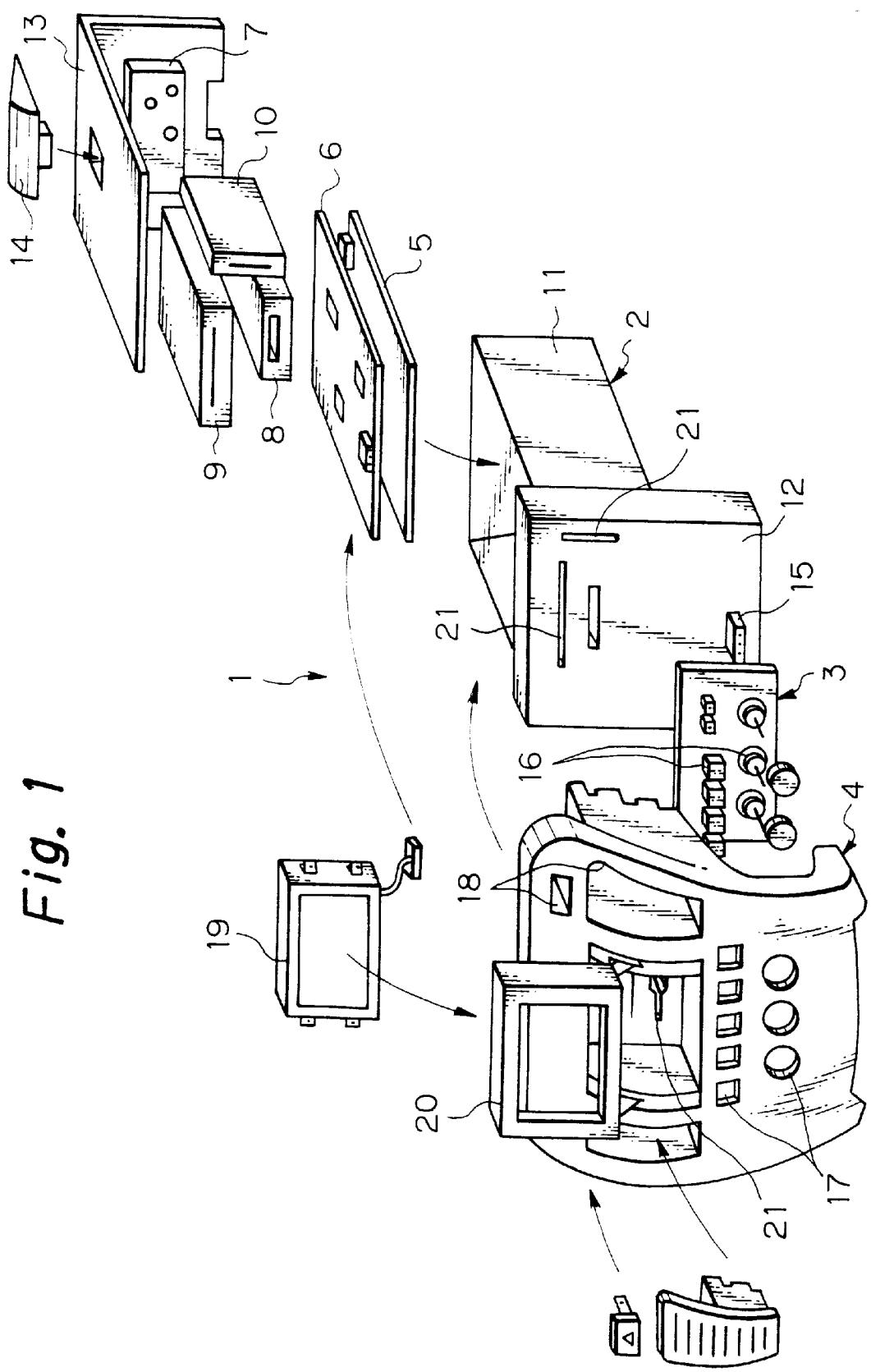
FIG. 1 is an exploded perspective view of an embodiment of a vehicle electronic control apparatus in accordance with the present invention.

A vehicle electronic control apparatus 1 or an electronic control apparatus 1 installed in an automotive vehicle, shown in FIG. 1, comprises a switch panel 3 having manual switches 16 which a driver operates, a cover panel 4 which puts on the switch panel 3 at the front side and holds it, and an electronic control unit 2 which is detachably coupled to the switch panel 3 and is adapted to mount various kinds of electronic unit.

The electronic control unit 2 comprises a system-accommodating section 11 for containing each of electronic units which are selected by a grade of an automobile vehicle and a driver's taste and a control section 12 for controlling each of the electronic units 5 to 10 described below. The electronic units include for example, a system board such as a car navigation system board 5, an audio visual (AV) system board 6, an alternating current (AC) control board 7, or the like, and a drive unit such as a cassette deck unit 8, a compact disk (CD) drive unit 9, an integrated circuit (IC) card drive unit 10 or the like. The control section 12 is connected through each wire harness (not shown) to each of the electronic units 5 to 10 contained in the system-accommodating section 11.

The control section 12 controls electronic equipments such as a CD changer, an antilock brake system, a suspension system, and the like in cooperation with the electronic units 5 to 10 or independently of them. An antenna 14 for a global positioning system (GPS) and a vehicle information and communication system (VICS) are attached to a cover 13 of the system-accommodating section 11. The antenna 14 is connected to the system-accommodating section 11 through the car navigation system board 5 and a wire harness (not shown).

The switch panel 3 is coupled to a connector 15 mounted on a front side of the control section 12 through a wire harness (not shown) or a connector (not shown). The switch panel 3 is provided with a communication function part 27 (see FIG. 3) which controls the communication between the vehicle electronic equipments and the control section 12 which controls the electronic units 5 to 10.

Manual switches 16 which send manual command signals are disposed on the switch panel 3.

The switch panel 3 is attached to the cover panel 4 at the rear side. The cover panel 4 is detachably attached to the electronic control unit 2 to enhance appearance of the vehicle electronic control apparatus 1.

The cover panel 4 is provided with switch holes 17 through which the manual switches 16 on the switch panel 3 extend and openings 18 which receive an air outlet and a hazard switch. The cover panel 4 also supports a display holder 20 which holds a liquid crystal display 19. The liquid crystal display 19 held on the display holder 20 is connected to a video controller (not shown) on the AV system board 6.

The cover panel 4 and electronic control unit 2 are provided with slits 21 through which a cassette tape, a CD disc, or an IC card comes into and out of the respective drive units 8, 9, and 10.

Figure 2:
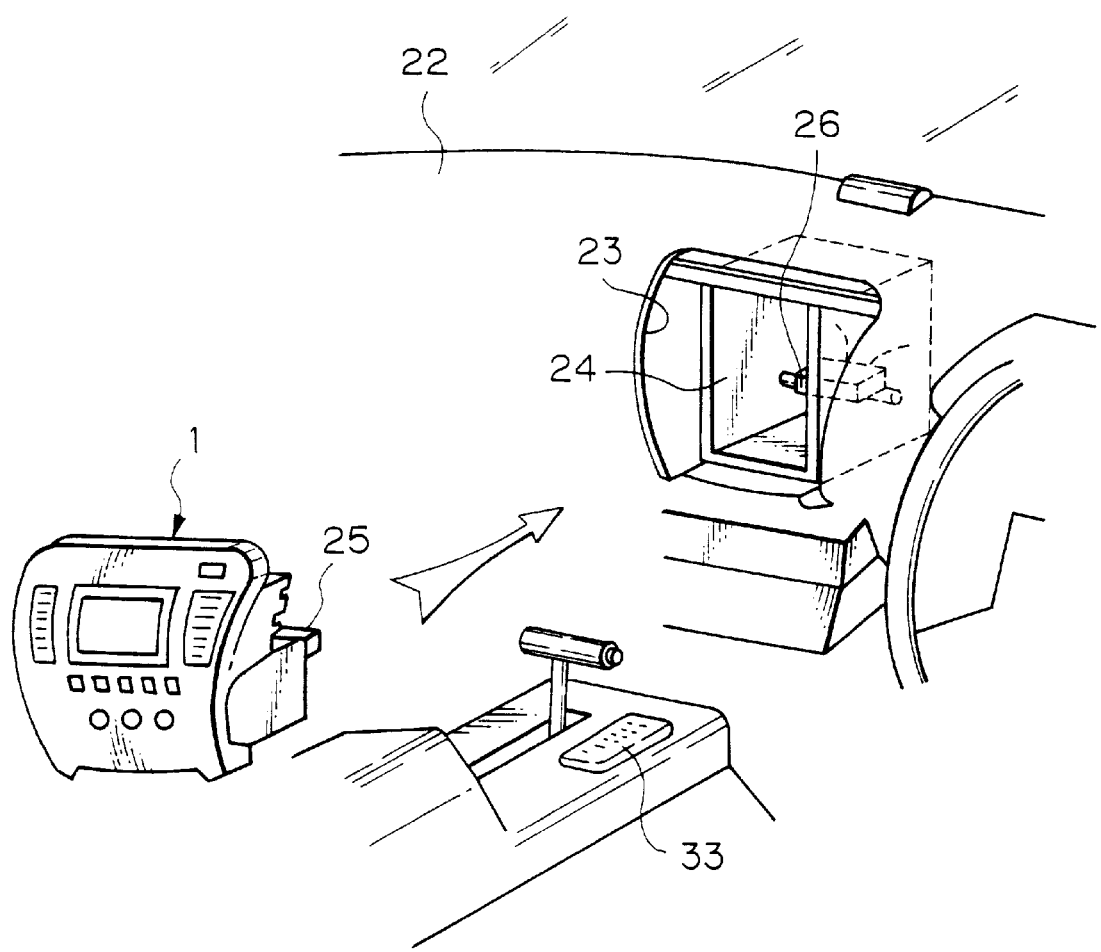
FIG. 2 is a perspective view of a partial interior of an automotive vehicle, illustrating an attachment of the vehicle electronic control apparatus shown in FIG. 1 onto an instrument panel of the vehicle.

The vehicle electronic control apparatus 1, as shown in FIGS. 1 and 2, is fitted in an accommodating cavity 23 in an instrument panel 22 in the automotive vehicle, after the apparatus 1 is assembled as a single unit.

A bracket 24 is secured to the accommodating cavity 23 in the instrument panel 22 in order to fix the vehicle electronic control apparatus 1 in the cavity 23. A receiving connector 26 is secured to the bracket 24 so that a connector 25 for a bus is coupled to the receiving connector 26 when the vehicle electronic control apparatus 1 is inserted into the bracket 24 in the accommodating cavity 23. The connector 25 is mounted on the rear side of the system-accommodating section 11 (FIG. 1) of the vehicle electronic control apparatus 1.

The bus connector 25 is connected through a wire harness (not shown) to a communication function part 27 (FIG. 3) on the switch panel 3. The bus connector 25 is an output of data through the communication function part 27 from the control section 12 of the electronic control unit 2 and from the electronic units 5 to 10. The receiving connector 26 is connected to a bus 34 of the vehicle LAN (FIG. 3) in which the control section 12 is connected to the electronic equipments to be controlled by the electronic units 5 to 10 (for example, an air compressor, a CD changer, an antilock brake system, a traction control system, and the like). The control section 12 can control the respective electronic equipments through the communication function part 27 and the LAN BUS 34 when the bus connector 25 mates with the receiving connector 26.

Accordingly, when the vehicle electronic control apparatus 1 is fitted in the accommodating cavity 23 in the instrument panel 22 in a built-in manner, the bus connector 25 is coupled to the receiving connector 26, thereby completing a necessary wiring connection. This makes it simple to assemble the apparatus 1 in the vehicle.

Figure 3:
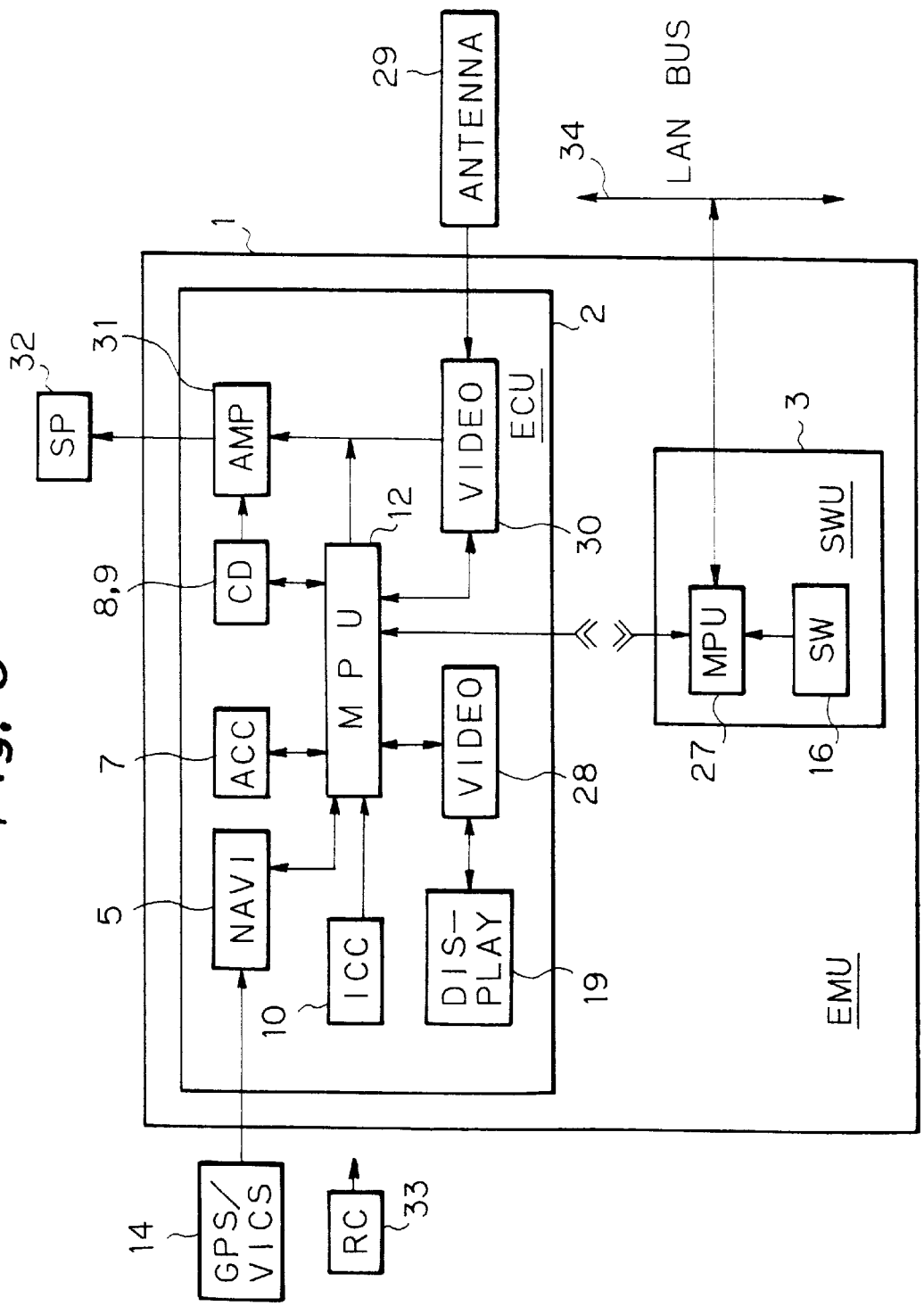
FIG. 3 is a block diagram of the vehicle electronic control apparatus shown in FIG. 2.

As shown in FIG. 3, in the vehicle electronic control apparatus 1, a command signal from the manual switch 16 on the switch panel 3 is transmitted through the communication function part 27 to the electronic control unit 2. The communication function part 27 transmits the command signal from the manual switch 16 to the control section 12 of the electronic control unit 2.

Figure 4:
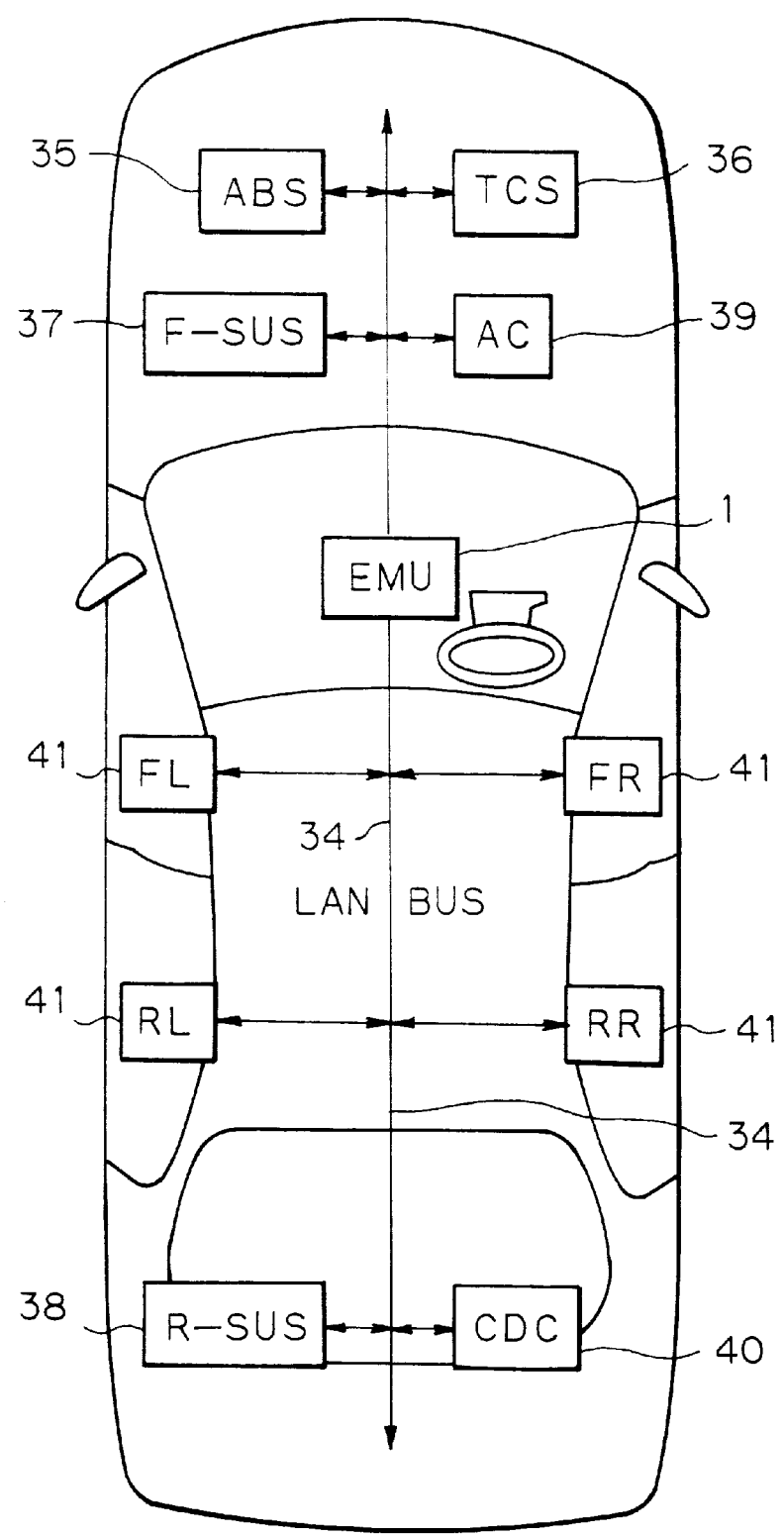
FIG. 4 is a block diagram of a local area network (LAN) in the automotive vehicle.

The communication function part 27, as shown in FIGS. 3 and 4, is connected to the LAN BUS 34 for the vehicle LAN and controls the communication between the LAN BUS 34 and the control section 12 of the electronic control unit 2. This communication utilizes a serial transmition according to the time-division multiplex communication.

To the LAN BUS 34 is connected to a system unit for vehicle movement such as an antilock brake system 35, a traction control system 36, rear and front suspension systems 37 and 38, and the like, a system unit for air-conditioning such as an air compressor 39, a CD changer 40, and the like, and a door lock system unit 41 for locks and power windows in the respective doors. These system units are arranged at suitable positions in the automotive vehicle and are controlled unitedly by the control section 12 of the electronic control unit 2. In this embodiment, the system units for vehicle movement 35, 36, 37, and 38 are controlled by a program installed in the control section 12 beforehand. The system units for air-conditioning 39, 40, are controlled by the control section 12 in cooperation with the electronic unit such as the AC control board 7, the CD drive unit 9, and the like. The door lock system unit 41 is controlled by the control section 12 in accordance with the command signal from the switch panel 3.

The control section 12 of the electronic control unit 2 also controls the respective electronic units 5 to 10 in accordance with the indication from the switch panel 3 and the judgment by itself.

The control section 12 indicates on the liquid crystal display 19 a playback condition from a CD or a cassette tape, navigation information from the car navigation system board 5 and antenna 14, and the like through the video controller 28 of the AV system board 6. Also, the control section 12 mixes a voice from a radio set or a television set which receives electric waves through the antenna 29 by the audio controller 30 of the system board 6 or a voice from the CD or the cassette tape with a voice of a voice navigation from the car navigation system board 5 or the antenna 14 and then the mixed voice is output from a speaker 32 through an amplifier 31. Accordingly, the driver can get the indication from the voice navigation without interrupting the music.

Also, the vehicle electronic control apparatus 1 may receive the indication on the liquid crystal display 19 from the driver by so-called display touch formation. Software for carrying out this operation is installed in an IC card to be inserted in the IC card drive unit 10 and is made in version-up.

Further, the vehicle electronic control apparatus 1 can be operated at a remote position by a remote controller 33.

As described above, since the vehicle electronic control apparatus 1 includes the electronic control unit 2 and the switch panel 3 separated from the unit 2, the switch panel 3 being provided with the communication function part 27 which controls the communication to the electronic equipmets 35, 36, 37, 38, 39, 40, 41 through the LAN BUS 34 for the vehicle LAN, it is possible to use in common the most expensive electronic control unit 2 among the various kinds of vehicle and to eliminate the preparation of another electronic control unit 2 when no LAN exists, thereby achieving a great cost-reduction in comparison with the prior art. In this case, addition and extension of the system boards 5, 6, 7 and/or the drive units 8, 9, 10 will reply to a change of a vehicle grade or a driver's taste.

It is necessary to prepare two kinds of switch panel 3, that is the one having the communication function part 27 and the other having no part 27 in accordance with presence and absence of the vehicle LAN. However, since the switch panel 3 itself is very inexpensive in comparison with the electronic control unit 2, there is no problem in general cost for a vehicle. Further, the switch panel 3 is one of electric devices which are difficult in common use among different type vehicles because the switch panel 3 itself is designed to accord with an interior of each vehicle. This will be of less problem.

It will be apparent from the foregoing that the vehicle electronic control apparatus of the present invention will contribute to cost-down of the vehicle because the electronic control section can be used in common among the various kinds of vehicle regardless of presence and absence of the vehicle LAN.

Also, the switch section separated from the electronic control section can effectively comply with the vehicle LAN, thereby reducing an impact to cost.

What is claimed is:

1. A vehicle electronic control apparatus for controlling the operation of one or more electronic devices for optional use in a vehicle provided either with a local area network (LAN) or a non-LAN wiring system, comprising:

an electronic control section for a common use received in an accommodating cavity in an instrument panel in said vehicle; and a switch section electrically connected to and separate from said electronic control section and said electronic devices, and having manual switches by which a driver gives command signals to said electronic control section and said electronic devices, said switch section being provided with a communication function part so that, together with said electronic control section, said switch section can control said electronic devices either through said LAN or through said non-LAN wiring system, said switch section being configured to accommodate an optional use of said electronic devices.

2. A vehicle electronic control apparatus according to claim 1, wherein said communication function part has a multiplex communication function so as to permit a decrease in the number of communication cables needed for connecting said electronic devices with said control apparatus.

3. The control apparatus according to claim 1, in which said apparatus can be operated from a remote location by a remote controller.

4. The control apparatus according to claim 1, in which said electronic control section is adapted to receive a variable and replaceable number of system boards depending upon the taste of a driver of said vehicle or upon the number and type of said electronic devices to be controlled.

* * * * *